United States Patent
Cao et al.

(10) Patent No.: US 10,019,471 B2
(45) Date of Patent: Jul. 10, 2018

(54) EVENT LOG SYSTEM

(71) Applicants: Hewlett-Packard Development Company, L.P., Houston, TX (US); Zhao Cao, Beijing (CN); Shimin Chen, Beijing (CN); Feifei Li, Salt Lake City, UT (US); Min Wang, Beijing (CN); Xiaoyang Wang, Shanghai (CN)

(72) Inventors: Zhao Cao, Beijing (CN); Shimin Chen, Beijing (CN); Feifei Li, Salt Lake City, UT (US); Min Wang, Beijing (CN); Xiaoyang Wang, Shanghai (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 281 days.

(21) Appl. No.: 14/763,488

(22) PCT Filed: Jan. 31, 2013

(86) PCT No.: PCT/CN2013/000108
§ 371 (c)(1),
(2) Date: Jul. 24, 2015

(87) PCT Pub. No.: WO2014/117298
PCT Pub. Date: Aug. 7, 2014

(65) Prior Publication Data
US 2016/0004733 A1    Jan. 7, 2016

(51) Int. Cl.
*G06F 17/30*    (2006.01)
*H04L 29/08*    (2006.01)
(Continued)

(52) U.S. Cl.
CPC .... *G06F 17/30312* (2013.01); *G06F 11/0709* (2013.01); *G06F 11/0778* (2013.01);
(Continued)

(58) Field of Classification Search
CPC ................................................ G06F 17/30563
See application file for complete search history.

(56) References Cited

U.S. PATENT DOCUMENTS

| | | |
|---|---|---|
| 2012/0284244 A1 | 11/2012 | Kamimura et al. |
| 2012/0310878 A1 | 12/2012 | Vuksan et al. |
| 2012/0330908 A1 | 12/2012 | Stowe et al. |

FOREIGN PATENT DOCUMENTS

| | | |
|---|---|---|
| CN | 102567495 | 7/2012 |
| CN | 102752322 | 10/2012 |

(Continued)

OTHER PUBLICATIONS

Blanas, S., Patel, J. M., Ercegovac, V., Rao, J., Shekita, E. J., & Tian, Y. (Jun. 2010). A comparison of join algorithms for log processing in mapreduce. In Proceedings of the 2010 ACM SIGMOD International Conference on Management of data (pp. 975-986). ACM.*

(Continued)

*Primary Examiner* — William Spieler
(74) *Attorney, Agent, or Firm* — Brooks, Cameron & Huebsch, PLLC

(57) ABSTRACT

An event log system and method are disclosed. The system includes a plurality of worker nodes to receive and store event log records from a plurality of log sources, and a coordinator node to maintain information about mapping from the plurality of log sources to the plurality of worker nodes. Each worker node comprises an IngestKV module to (Continued)

temporarily store event log records from the log sources and a TimeRangeKV module to permanently store the event log records.

13 Claims, 2 Drawing Sheets

(51) Int. Cl.
    *G06F 11/07*     (2006.01)
    *G06F 21/55*     (2013.01)
    *G06F 17/27*     (2006.01)

(52) U.S. Cl.
    CPC ........ *G06F 17/2705* (2013.01); *G06F 21/552* (2013.01); *H04L 67/10* (2013.01); *H04L 67/22* (2013.01)

(56) References Cited

FOREIGN PATENT DOCUMENTS

| | | |
|---|---|---|
| WO | WO-2011/130706 | 10/2011 |
| WO | WO-2012/010219 | 1/2012 |

OTHER PUBLICATIONS

Cao, Z., Chen, S., Li, F., Wang, M., & Wang, X. S. (2013). LogKV: Exploiting key-value stores for event log processing. CIDR.*

Wang, Y., Que, X., Yu, W., Goldenberg, D., & Sehgal, D. (Nov. 2011). Hadoop acceleration through network levitated merge. In Proceedings of 2011 International Conference for High Performance Computing, Networking, Storage and Analysis (p. 57). ACM.*

Chechik, Log Event Processing with Apache HBase, Feb. 17, 2011, accessed Aug. 3, 2017 at http://blog.cloudera.com/blog/2011/02/log-event-processing-with-hbase/.*

Wikipedia, MapReduce, Jan. 23, 2013, accessed Aug. 3, 2017 at https://en.wikipedia.org/w/index.php?title=MapReduce&direction=prev&oldid=539290345.*

Wikipedia, Apache Hadoop, Jan. 23, 2013, accessed Aug. 3, 2017 at https://en.wikipedia.org/w/index.php?title=Apache_Hadoop&oldid=534518165.*

International Search Report and Written Opinion dated Oct. 31, 2013 issued on PCT Patent Application No. PCT/CN2013/000108 dated Jan. 31, 2013, The State Intellectual Property Office, the P.R. China.

Splunk, Logging Best Practices, download date Jul. 24, 2015. http://dev.splunk.com/view/logging/SP-CAAADP6.

Wang Lam, et al., "Muppet: MapReduce-Style Processing of Fast Data", University of Wisconsin-Madison, pp. 1814-1825, Aug. 27-31, 2012. http://vldb.org/pvldb/vol5/p1814_wanglam_vldb2012.pdf.

* cited by examiner

EVENT LOG SYSTEM

CLAIM FOR PRIORITY

The present application is a national stage filing under 35 U.S.C 371 of PCT application number PCT/CN2013/000108, having an international filing date of Jan. 31, 2013, the disclosure of which is hereby incorporated by reference in its entirety.

BACKGROUND

Event log processing and analysis can be used in many applications ranging from security management and IT troubleshooting to user behavior analysis. Event records are generated by a wide range of hardware devices (e.g. networking devices) and software systems (e.g. operating systems, web servers, database servers), reporting information about system status, configurations, operations, warnings, error messages, and so on. Security analysts can process event logs to detect potential security breaches. System administrators or software developers can analyze event logs to find root causes of errors or system crashes. Event logs (e.g., web server logs) also provide information about application workloads and user behaviors, and application designers can analyze the logs to improve the efficiency and quality of applications.

BRIEF DESCRIPTION OF THE DRAWINGS

The accompanying drawings illustrate various examples of various aspects of the present disclosure. It will be appreciated that the illustrated element boundaries (e.g. boxes, groups of boxes, or other shapes) in the figures represent one example of the boundaries. It will be appreciated that in some examples one element may be designed as multiple elements or that multiple elements may be designed as one element. In some examples, an element shown as an internal component of another element may be implemented as an external component and vice versa.

DETAILED DESCRIPTION

In recent years, system scales have been rapidly growing, and accordingly the amount of event log records is also rapidly increasing. For the purposes of auditing and data analysis, it is often required to store event log data for several years. The growing system scales put pressures on the storage and processing of event logs. Moreover, event logs from different hardware devices and software systems usually have different formats. There may be multiple types of event log records in a single log. Records of different formats may contain different kinds of information, making it difficult to design a uniform schema for all logs.

Systems and methods for event log management are disclosed herein. An example of the systems and methods can store event log records on multiple nodes in key-value pairs, which sometimes are accompanied by timestamps. According to an aspect of the present disclosure, event log records within the same time interval (referred to as a time range unit herein) can be stored in the same node and a node can also store a copy of event log records for another node(s) so as to e.g. facilitate query operations such as windows join. According to another aspect of the present disclosure, incoming event log records within a period of time can be cached first and then distributed to nodes for storage in rounds. Examples of the systems and methods described herein can support a variety of event log formats, and provide a scalable and reliable storage for event logs.

In the following, specific examples of the present disclosure will be described with reference to the drawings.

Figure 1:
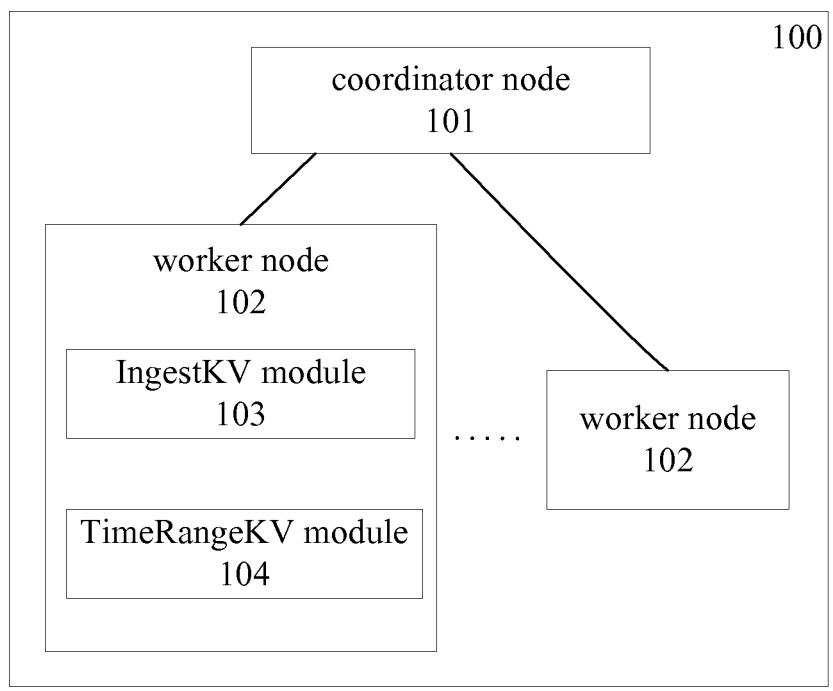
FIG. 1 is a schematic diagram of an event log system according to an example of the present disclosure.

Referring now to FIG. 1, a schematic diagram of an event log system according to an example of the present disclosure is described. The event log system 100 shown in FIG. 1 includes a coordinator node 101 and a plurality of worker nodes 102 that can be located in a data center. The coordinator node 101 and the worker nodes 102 are coupled together through a network (not shown) such as, but not limited to, the Internet, an Intranet, a local area network (LAN), a wireless local area network (WLAN), etc. The coordinator node 101 and the worker nodes 102 can be implemented by a server, a desktop computer, a notebook computer, a laptop computer, a blade server, or any other computing devices.

The event log system 100 can be coupled to a plurality of log sources (not shown in FIG. 1) from which event log records can be transmitted to the event log system 100. A log source as used herein refers to any hardware device or software systems that are capable of generating event log records. The log sources can be coupled to the event log system 100 by various types of communication networks. The log sources can be located in the same data center as the event log system 100 or can be located outside the data center.

The event log system 100 can also be coupled to a number of query clients (not shown in FIG. 1). The query clients may be used to perform various query operations on the event log records stored in the event log system 100, including, but not limited to, selection, aggregation, window join, join with reference tables, etc. Similar to the log sources, the query clients can communicate with the event log system 100 through a communication network.

According to an example of the present disclosure, the plurality of worker nodes 102 may be configured to receive and store event log records from the log sources. Each of the worker nodes 102 may comprise an IngestKV module 103 and a TimeRangeKV module 104, wherein the IngestKV module 103 may be used to temporarily store event log records from the log sources and the TimeRangeKV module 104 may be used to permanently store these event log records. The coordinator node 101 may be configured to maintain information about mapping from the plurality of log sources to the plurality of worker nodes 102. In some examples, the coordinator node 101 may further be configured to maintain the layout of the stored event log data on these worker nodes 102.

The worker nodes 102 may obtain event log records or data from one of the log sources in one of the following three ways. In an example, an agent can be run on the log sources, extract and send event log records generated therein to a worker node 102. In another example, the log sources may be configured to forward event log records to a worker node 102. In yet another example, a log source can store event log records to local files and then a worker node 102 can use a transfer protocol such as ftp/scp/sftp to obtain the log records. In this example, the coordinator node 101 can record the log extraction method for every log source.

Suppose there are N worker nodes 102 in the event log system 100, the average throughput of these log sources are $I_1, I_2, \ldots, I_S$, with S being the number of log sources, and the total incoming throughput is $B_{ingest}$, i.e.

$$B_{ingest} = \sum_{i=1}^{S} I_i.$$

In order to balance the log ingestion throughput across the worker nodes 102, in an example, the coordinator node 101 may be further configured to assign the log sources to the worker nodes 102. It is appreciated that log sources that can extract and send event log records to a worker node as described above can be referred to as being "dividable" in that they can divide their log traffic among multiple worker nodes 102. Conversely, the other log sources can be referred to as being "individable" and may each be assigned to a single worker node 102.

According to an example of the present disclosure, the coordinator node 101 may be configured to assign the log sources to the worker nodes 102 by first assigning individable log sources to the worker nodes 102, and then assigning dividable log sources to the worker nodes 102 so as to balance throughput assigned among the worker nodes 102.

In an example, a greedy algorithm can be used to assign the individable log sources to the worker nodes 102. An example algorithm is presented below:

| Algorithm 1 Assign individable log sources |
|---|
| Require: Throughput of individable log sources are $l_1, l_2, \ldots, l_d$ |
| Ensure: Aggregate throughput assigned to worker k is w[k], where k = 1, 2, ..., N |
| 1: Set all w[k] to 0, where $1 \leq k \leq N$ |
| 2: Sort $l_1, l_2, \ldots, l_d$ in descending throughput order |
| 3: for i = 1 → d do |
| 4:   k = arg min{w[k]}, $1 \leq k \leq N$ |
| 5:   Assign log source i to worker k |
| 6:   w[k] ← w[k] + $l_i$ |

The above algorithm 1 sorts all individable log sources in descending order of their throughput (Line 2 in algorithm 1). Then it goes into a loop to assign every individable log source to a worker node (Line 3). An iteration in the loop computes the worker node with the least log ingestion throughput that has been assigned in previous iterations (Line 4), and assigns the next log source in the sort order to the worker node (Line 5-6).

After the individable log sources are assigned, the dividable log sources can be assigned to worker nodes 102 in order to balance the assigned throughput across worker nodes 102 as much as possible. An example algorithm for this is given below.

| Algorithm 2 Assign dividable log sources |
|---|
| Require: Throughput of dividable log sources are $l_{d+1}, \ldots, l_s$ |
| Ensure: Aggregate throughput assigned to worker k is w[k], where k = 1, 2, ..., N |
| 1:   Compute divTotal = $\sum_{i=d+1}^{s} l_i$ |
| 2: Sort worker nodes in descending throughput order so that w[ord[k]] ≤ w[ord[k + 1]], where ord[.] is an index array, and $1 \leq k < N$ |
| 3: t ← divTotal |
| 4: for k = 1 → N do {Compute targetMin } |
| 5:   $t \leftarrow t + w[ord[k]]$  $\left\{ t = divTotal + \sum_{j=1}^{k} w[ord[j]] \right\}$ |
| 6:   if (k == N) OR (t/k ≤ w[ord[k + 1]]) then |
| 7:     targetMin ← t/k |
| 8:     break |
| 9: i ← d + 1 |
| 10: for j = 1 → k do {Assign log sources} |
| 11:   diff ← targetMin − w[ord[j]] |
| 12:   while diff > 0 do |
| 13:     if diff ≥ $l_i$ then |
| 14:       Assign the rest of $l_i$ to worker ord[j] |
| 15:       diff ← diff − $l_i$ |
| 16:       $l_i$ ← 0 |
| 17:       i ← i + 1 |
| 18:     else |
| 19:       Assign diff from $l_i$ to worker ord[j] |
| 20:       $l_i$ ← $l_i$ − diff |
| 21:       diff ← 0 |
| 22:   w[ord[j]] ← targetMin |

In this algorithm, divTotal is the aggregate throughput of all dividable log sources. Algorithm 2 sorts all the worker nodes 102 in an ascending order of the current assigned throughput (Line 2).

Then, algorithm 2 tries to reduce the difference between the maximum and minimum assigned throughput for individual worker nodes 102. Generally, log ingestion throughput can be assigned to worker node ord[1], which has the current minimum throughput. When its throughput is increased to the same as w[ord[2]], both of worker nodes ord[1] and ord[2] have the minimum throughput. Then algorithm 2 needs to assign throughput to both worker nodes ord[1] and ord[2] in order to increase the minimum throughput among all worker nodes. Similarly, when the assigned throughput of worker nodes ord[1] and ord[2] is equal to w[ord[3]], it will need to increase the throughput of three worker nodes together.

In general, suppose the final minimum throughput among all worker nodes is targetMin. Then k worker nodes 102 (ord[1], . . . , ord[k]) will have targetMin as their throughput, while the throughputs of the other worker nodes remain unchanged. Since the newly assigned throughput is equal to divTotal, the following equation is obtained:

$$\sum_{j=1}^{k}(targetMin - w[ord[j]]) = divTotal \quad (1)$$

$$k == N \wedge targetMin \leq w[ord[k+1]]$$

Using Equation 1, Algorithm 2 computes targetMin as $$\left( divTotal + \sum_{j=1}^{k} w[ord[j]] \right) \Big/ k$$

(Line 3-8).

Finally, the algorithm assigns dividable log sources to worker nodes ord[1], . . . , ord[k] to increase their throughput to targetMin (Line 9-22).

After the computation, the coordinator node 101 configures the mapping from log sources to worker nodes 102 accordingly.

It is appreciated that algorithms 1 and 2 are just examples of how to assign log sources and those skilled in the art can conceive of other suitable approaches in light of the teachings herein.

According to an example of the present disclosure, the IngestKV module 103 in each worker node 102 can be configured to parse an event log record received from the log sources into key-value pairs. Worker nodes 102 can perform event log record parsing in a distributed fashion. On a worker node 102, the IngestKV module 103 can run a log source adapter module. The log source adapter module maintains a log source table, which records the type and parsing rules of every assigned log source 102. When an incoming log event arrives at a worker node 102, the adapter module parses the event log record to extract information as key-value pairs. There are also key-value pairs representing the log source, the arrival timestamp, and if required, the raw event. The IngestKV module 103 maintains event log records in a time order on a worker node 102. The log parsing rules can be manually or automatically generated for all different types of log sources.

Figure 2:
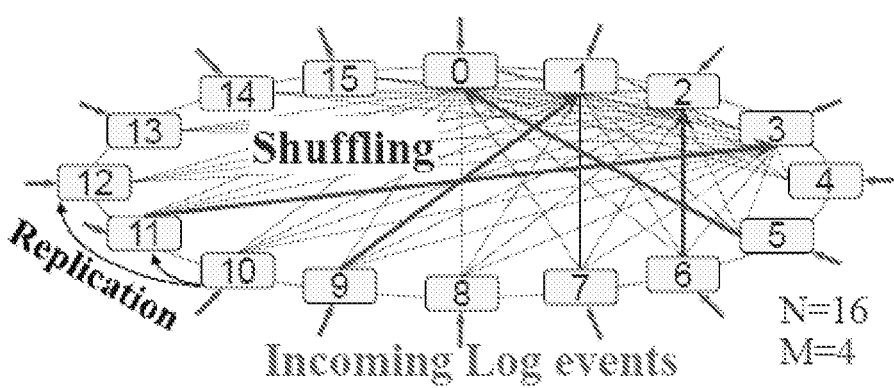
FIG. 2 is a schematic diagram of log shuffling according to an example of the present disclosure.

As described above, the event log records received by the IngestKV module 103 need to be transferred or shuffled to the TimeRangeKV module 104 for permanent storage. FIG. 2 illustrates a schematic diagram of log shuffling according to an example of the present disclosure. As shown, there are a total of N=16 worker nodes, each with an ID from 0 to N−1. However, it will be understood that the event log system can include any number of worker nodes and the present disclosure is not limited in this regard.

According to an example of the present disclosure, the TimeRangeKV module 104 can be configured to store event log records based on a time range unit (TRU). For example, in TimeRangeKV module 104, a TRU bucket is mapped to a worker node 102 if the start timestamp of a time range satisfies the following condition:

$$\text{nodeID} = \lfloor \text{StartTimeStamp}/\text{TRU} \rfloor \text{ modulo } N \quad (2)$$

wherein nodeID is 0, 1, 2 . . . N−1.

Note that $i = \lfloor \text{StartTimeStamp}/\text{TRU} \rfloor$ uniquely identifies a TRU bucket and a corresponding worker node 102 can be referred to as the owner of $\text{TRU}_i$. Suppose that TRU of the current time is mapped to a worker node j. If the event log records were immediately forwarded to worker node j, worker node j would be overwhelmed by a shuffling bandwidth of $B_{ingest}$. In order to reduce the shuffling bandwidth, the property of data center network that non-conflicting network connections can often achieve the maximum bandwidth at the same time can be exploited and the IngestKV module 103 can be configured to cache a number of event log records and then shuffle the cached event log records to the TimeRangeKV module 104 on a corresponding worker node 102 in rounds for storage, according to an example of the present disclosure.

In particular, during shuffling, a number of worker nodes 102 can simultaneously receive shuffled event log records. In this case, a round may take M×TRU time, wherein M is the number of worker nodes 102 that simultaneously receive the shuffled event log records. In the example shown in FIG. 2, M is 4. In this example, up to two rounds of incoming event log records are kept in IngestKV module 103 on a worker node 102. In a round r, the IngestKV module 103 buffers the incoming event log data for the current round, and shuffles the event log data arrived in round r−1 to M receiving worker nodes. At the end of round r, the event log data of round r−1 can be removed, and the event log data of round r will be shuffled in the next round. In this way, the average shuffling bandwidth of a receiving worker node 102 is reduced to $B_{ingest}/M$.

In order to shuffle event log data from N worker nodes to M receiving worker nodes, a randomized shuffling approach can be adopted so as to avoid hot spots. Specifically, a receiving worker node maintains a to-do list, which is initialized with all worker nodes. Then the receiving worker node goes into a loop. In every iteration, it randomly selects a node from the to-do list, transfers event log records from the node, and then updates the to-do list by deleting this node. In the example shown in FIG. 2, there are four receiving worker nodes, i.e., node 0, 1, 2, and 3. Event log data will be transferred from all 16 worker nodes to the 4 receiving worker nodes as shown by the thin lines. In a certain iteration, the receiving worker nodes choose different nodes to transfer event log data therefrom using the randomized approach, as illustrated by the bold arrows. It will be understood that any suitable shuffling approach can be utilized to transfer the event log data and the present example does not intend to limit the scope of the present invention.

According to an example of the present disclosure, both the IngestKV module 103 and the TimeRangeKV module 104 in a worker node 102 may replicate the event log records for high availability. As described above, the IngestKV module 103 buffers incoming event log data for a short amount of time, while the TimeRangeKV module 104 may store log data for a long time (e.g. up to several years). Consequently, data in the TimeRangeKV module 104 are expected to experience more failures compared to the IngestKV module 103. Therefore, the TimeRangeKV module 104 may maintain more copies of event log data than the IngestKV module 103.

According to an example, each TimeRangeKV module 103 can be configured to store the event log records within a number of adjacent TRUs. FIG. 2 also shows such a replication strategy for the TimeRangeKV module 104. A worker node j will replicate its event log data to worker node j+1 and worker node j+2 modulo N. Note that three adjacent TRU buckets will be present on a single worker node 102 due to this replication strategy. For the IngestKV module 103, the coordinator node 101 can balance the network traffic by choosing an appropriate replication strategy for it. In the simplest case, every two worker nodes are organized into a replication pair, forwarding incoming event log data to each other. However, if the log source assignment does not achieve a good balance, the coordinator node 101 can decide to divide the replicating traffic intelligently in order to balance the overall log ingestion traffic including replication. Moreover, the replication efficiency in the IngestKV module 103 may be improved if log sources are capable of re-sending recent log events. Suppose the coordinator node knows that a log source can re-send last t seconds of event log data. Then, rather than forwarding every individual event log, the IngestKV module 103 will forward a batch of this log source's event logs every t seconds to reduce the network cost.

A worker node failure can be detected when a network connection (for replication, shuffling, or query processing) times out. When a worker node i fails, the coordinator node 101 can remap the TRUs owned by the worker node i temporarily to another worker node, e.g. a worker node with ID of i+1 modulo N. In the meantime, the coordinator node 101 may obtain and initiate another machine in the data center to replace the failed worker node.

The overall network traffic of a receiving worker node should be lower than its available bandwidth. Log ingestion and replication consumes $2B_{ingest}/N$ bandwidth. Log shuffling takes $B_{ingest}/M$ bandwidth. Suppose the log compression ratio is f. Replicating two data copies in TimeRangeKV modules takes $2B_{ingest}/(Mf)$ bandwidth. Therefore, the following constraint can apply:

$$\left(\frac{2}{N} + \frac{1}{M} + \frac{2}{Mf}\right) B_{ingest} \leq B_{node}$$

Thus, according to an example, the number (i.e. M) of worker nodes that simultaneously receive shuffled event log records can be selected at least partly based on at least one of the number of the worker nodes N, network bandwidth of a single worker node $B_{node}$, total log ingestion bandwidth $B_{ingest}$ and log compression ratio f.

In an example, the amount of event log data buffered in the IngestKV module 103 can be minimized for query efficiency. Window joins on data in the IngestKV module 103 require expensive data shuffling operations. Therefore, M can be computed as follows:

$$M = \left\lceil \left(1 + \frac{2}{f}\right) \frac{1}{\frac{B_{node}}{B_{ingest}} - \frac{2}{N}} \right\rceil$$

In an example, the coordinator node 101 can also try to balance event log ingestion traffic when a subset of log sources suddenly experience high traffic. If a dividable log source sees a dramatic throughput increase, the coordinator node 101 can divide this log source and reassign it. If an individable log source sees a sudden increase in throughput, the coordinator node 101 can re-assign the log source as in Algorithm 1. After removing the old throughput of this log source, the coordinator node 101 can compute the worker node 102 with the minimum assigned throughput, and then assign the individable log source to it. The coordinator node 101 can periodically check the gap between the maximum and minimum assigned log ingestion throughput among worker nodes 102. If the gap is above a threshold, the coordinator node 101 can re-compute the log source mapping using Algorithm 1 and Algorithm 2 described above.

According to an example of the present disclosure, the TimeRangeKV module 104 provides persistent storage for event log records by way of a key-value store. As described above, it uses the time range (in multiple of the TRU) as the row key to partition incoming event log records. In particular, all the event log records within the same TRU can be stored on the same worker node. That is to say, all records within a time range in [l·TRU, (l+1)TRU) of length TRU ($\exists l \in [0, \lceil Now/TRU \rceil - 2M)$) are stored in a worker node 102, wherein Now represents the current time, (except the most recent $2M \cdot TRU$ records that will be buffered in the IngestKV module 103, or being shuffled from the IngestKV module 103 to the TimeRangeKV module 104). During event log shuffling, the event log data transferred from each IngestKV module 103 are in a time order. A receiving worker node will store the log data shuffled from an IngestKV module 103 temporarily in a file. When this receiving worker node receives the log data from all N IngestKV modules 103, it will perform a multi-way merge operation on the N temporary files, and store the sorted records into the underlying key-value store. There can be multiple ways to store the data.

The following table shows a storage structure according to an example of the present disclosure.

| $t_i \in [l \cdot TRU, (l+1) \cdot TRU)$ row key: $k = t_i/TRU$ | | | | |
|---|---|---|---|---|
| record | timestamp | $a_1$ | ... | $a_d$ |
| $r_1$ | $t_1$ | $v_{1,1}$ | ... | $v_{1,d}$ |
| $r_2$ | $t_2$ | $v_{2,1}$ | ... | $v_{2,d}$ |
| | | ... | | |
| $r_u$ | $t_u$ | $v_{u,1}$ | ... | $v_{u,d}$ | column $a_1$, $V_1 = \{v_{1,1}, \ldots, v_{1,d}\}$
$V_1' = \{v_{1,2}, v_{1,5}, \ldots\}$,
$b_1 = [0, 1, 0, , 1, \ldots]$
... column $a_d$, $V_u = \{v_{u,1}, \ldots, v_{u,d}\}$
$V_u' = \{v_{u,1}, v_{u,4}, \ldots\}$, $b_u = [1, 0, 0, 1, \ldots]$ Suppose the event log records in a time range of length TRU coming into worker node j are an ordered set $R = \{r_1, r_2, \ldots, r_u\}$ for some integer value u, ordered by their timestamps. Each event log record is converted from a log event in the raw data by the IngestKV module 103 and consists of a timestamp and a set of key-value pairs. For example, an event log record from a network traffic log may be {t, (source IP, value), (destination IP, value)}. Without loss of generality, assume that each record has a format of {t, $(a_1, v_1), \ldots, (a_d, v_d)$}; and the jth value of the ith record in R is denoted as $v_{i,j}$. Since different records may not have the same set of key-value pairs, value $v_{i,j}$ may simply be a NULL value, e.g., if there is no parsing rule on extracting the value of key $a_j$ for a record $r_i$. Hence, d denotes the total distinct number of keys for which the IngestKV module 103 has parsed and extracted any values from raw log events in a time range.

All records in R are stored in a single row with the row key $k = \lfloor t/TRU \rfloor$. The ith key-value pair $(a_i, v_i)$ for all records in R is referred to as the ith column of these records. The ith column from all records of R is organized into an array $A_i$. The array $A_i$ is stored as a column key-value pair under row key k, where the column key is $a_i$, and the value $V_i$ contains all the values from the entire column i. That is, $V_i = \{v_{1,i}, \ldots, v_{u,i}\}$. By doing so, for a row key k, d columns can be obtained, which will be stored into the underlying key-value store.

Before inserting the row key k and the columns into the underlying key-value store, the TimeRangeKV module 104 can compress the data in order to reduce storage overhead, and hence improve query efficiency as well. An example solution can be simply compressing the value $V_i$ of a column $a_i$ at its entirety. However, since $V_i$ often has many NULL values, event logs are of different types, and some event logs with certain attributes occur only infrequently (e.g., when an exception did occur), another solution can be compressing $V_i$ after removing its NULL values. To do so, a bitmap index $b_i$ of size u can be created for $V_i$, where $b_i(j) = 0$ if $v_{j,i} = $ NULL and 1 otherwise. After this, a vector is produced that consists of only non-NULL values from $V_i$ (noted that the order is still preserved). Given the vector and $b_i$, $V_i$ can be reconstructed. Then the vector and $b_i$ can be compressed separately for column $a_i$ and the two compressed values are stored into the underlying key-value store (under the column $a_i$ for the row key k). This process can be repeated for each column, from $a_1$ to $a_d$ in turn.

When there are a large number of records in a time range, the above process can be refined by introducing smaller "rows" locally. That is, a time range can be further partitioned into a number of smaller, but contiguous, time ranges in a local node. Then, within each smaller time range, the above process can be applied. This can achieve better query efficiency for point queries because only the smaller time ranges of data are fetched and uncompressed.

Given the storage structure for event log data described above, query processing can be performed efficiently in the event log system 100. The TimeRangeKV module 104 stores event log data that arrived 2M·TRU time ago, while more recent log events reside in the IngestKV module 103. For simplicity, the log data being shuffled is not used in query processing. According to a query's time range predicate (or any time if not specified), the query is executed either on the TimeRangeKV module 104 or on the IngestKV module 103 or on both if the time range spans the timestamp (now −2M·TRU).

In the following, query processing on the TimeRangeKV module 104 and the IngestKV module 103 are discussed respectively.

Selection/Projection Queries in the TimeRangeKV module 104 and IngestKV module 103: Selections and projections can be efficiently processed in a distributed fashion on worker nodes 102. In the IngestKV module 103, a row key corresponds to an event record, and extracted event fields are stored as column key-value pairs. Therefore, selections and projections are performed on the row records. In the TimeRangeKV module 104, selections can use bitmap indexes to extract qualified records, and projections can directly take advantage of the column representation. As all columns are stored in the same order, it is straightforward to reconstruct event records.

Window Joins between Event Log Data in the TimeRangeKV module 104: Since each TimeRangeKV module 104 may store the event log records within a number of adjacent TRUs, thus a windows join operation with a windows size less than or equal to twice the number of adjacent TRUs minus one can be performed locally on a worker node 102.

In particular, for any i, $TRU_i$'s owner also stores a copy of $TRU_{i-1}$ and $TRU_{i-2}$ according to the above example, thus it contains data within any time window ending in $TRU_i$ and with a size up to 2TRU. This means that window joins with a window size less than or equal to 2TRU can be handled efficiently by performing local joins on worker nodes 102.

Larger window sizes may require communication among worker nodes 102. For a window size within the range of 2TRU to 5TRU, $TRU_i$'s owner needs to communicate with $TRU_{i-3}$'s owner so that event log data in $TRU_{i-5}, \ldots, TRU_i$ can be available for the join operation. In general, a worker node 102 may communicate with k other worker nodes for a join query if its window size is within the range of $(3k-1)TRU$ to $(3k+2)TRU$, wherein k is $1, \ldots, \lceil N/3 \rceil$.

Window Joins between Event Log Data in the IngestKV module 103: In contrast to the TimeRangeKV module 104, the IngestKV module 103 may perform log data shuffling for window joins. This can be implemented with a Map/Reduce framework (e.g., Hadoop).

Group-by/Aggregation Queries in TimeRangeKV 104 and IngestKV modules 103: Group-by/aggregation queries can be processed using the Map-Reduce framework (e.g., Hadoop).

The choice of TRU impacts the query performance of both TimeRangeKV and IngestKV modules 103-104. A smaller TRU may lead to a smaller amount of data stored in the IngestKV module 103. Consequently, window join queries spanning both the IngestKV and TimeRangeKV modules 103-104 would shuffle less data in the IngestKV module 103, thereby obtaining a better performance. In the TimeRangeKV module 104, a larger TRU means that window joins with larger time windows can be efficiently handled. On the other hand, a time range predicate may be mapped to fewer number of worker nodes. This will affect neither large analysis queries spanning long time ranges nor point queries focusing on very short time periods. However, selection queries with medium sized time range predicates may see fewer computation nodes when TRU gets larger.

According to an example of the present disclosure, TRU can be selected based on workload. For example, TRU can be set to be half of the most common time window size in window joins.

Figure 3:
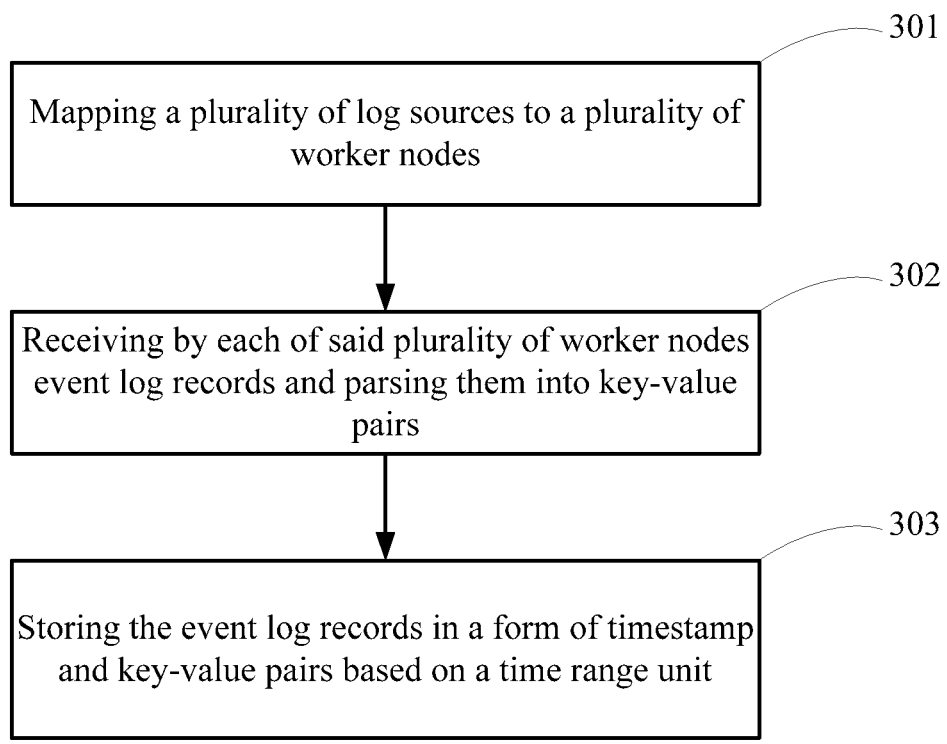
FIG. 3 is a process flow diagram for a method of managing event logs according to an example of the present disclosure.

With reference to FIG. 3 now, a process flow diagram for a method of managing event logs according to an example of the present disclosure is illustrated. At block 301, a plurality of log sources are mapped to a plurality of worker nodes. At block 302, each of the plurality of worker nodes receives event log records and parses them into key-value pairs. At block 303, the event log records are stored in a form of timestamp and key-value pairs based on a time range unit (TRU). In an example, all the event log records within the same TRU are stored on the same worker node.

The event log system described above is amenable to sampling based approximate query processing. For analysis queries on large time ranges, a subset of TRUs can be sampled for estimation. If necessary, a finer-grain sample can be generated by sampling event records in every related TRU. The latter can mainly reduce network communications, while the former can reduce the local I/O computation and network cost.

If a particular event attribute often appears in the filtering criteria of queries, it may be desirable to create a secondary index on this event attribute to speed up query processing. In order to support secondary indices on individual TimeRangeKV modules, a secondary index can be created on all the event log data in a TimeRangeKV module or a secondary index can be created for every TRU in the TimeRangeKV module. Various types of indices can be employed. For example, if the number of distinct values of the event attribute is low, a bitmap index can be employed, and a bitmap can be stored for every value. Each bitmap can be stored efficiently using the scheme described above.

The event log system described above is optimized for joins with time windows. However, if it is desirable to optimize event log data layout for other types of joins (e.g., location window joins), the same optimization strategy can be applied. And data replication can be utilized so that one replica is optimized for one type of joins (e.g. time window joins), while the other replica is optimized for another type of joins (e.g. location window joins).

The event log system described above can store and process a vast amount of log data and can also handle up a burst of incoming log data. In addition, the system can efficiently support both interactive exploratory queries which can be useful when users look into a specific problem or try to gain new insights, and batch computation which can be adopted when the processing task is well defined. The event log system presented herein can also support many query types, including selections on specified time ranges and with categorical filtering criteria, joins among event log data in time windows (e.g. detecting user sessions, looking for correlated events), joins between event log data and reference tables (e.g. user profiles), and aggregations.

From the above depiction of the implementation mode, the above examples can be implemented by hardware, software or firmware or a combination thereof. For example the various methods, processes, modules and functional units described herein may be implemented by a processor (the term processor is to be interpreted broadly to include a CPU, processing unit, ASIC, logic unit, or programmable gate array etc.) The processes, methods and functional units may all be performed by a single processor or split between several processors. They may be implemented as machine readable instructions executable by one or more processors. Further the teachings herein may be implemented in the form of a software product. The computer software product is stored in a storage medium and comprises a plurality of instructions for making a computer device (which can be a personal computer, a server or a network device, etc.) implement the method recited in the examples of the present disclosure.

The figures are only illustrations of an example, wherein the modules or procedure shown in the figures are not necessarily essential for implementing the present disclosure. Moreover, the sequence numbers of the above examples are only for description, and do not indicate an example is more superior to another.

Those skilled in the art can understand that the modules in the device in the example can be arranged in the device in the example as described in the example, or can be alternatively located in one or more devices different from that in the example. The modules in the aforesaid example can be combined into one module or further divided into a plurality of sub-modules.

What is claimed is:

1. An event log system, comprising:
a plurality of worker nodes to receive and store event log records from a plurality of log sources;
a coordinator node to maintain information about mapping from said plurality of log sources to said plurality of worker nodes, wherein each of said worker nodes comprises a processor to cause:
an IngestKV module to temporarily store event log records from the plurality of log sources; and
a TimeRangeKV module to permanently store said event log records within a plurality of adjacent time range units (TRUs), wherein the IngestKV and the TimeRangeKV perform a window join operation and wherein the IngestKV module and the TimeRangeKV module replicate said event log records.

2. The event log system of claim 1, wherein said TimeRangeKV module stores event log records based on the (TRU).

3. The event log system of claim 2, wherein all the event log records within the same TRU are stored on the same worker node.

4. The event log system of claim 2, wherein said IngestKV module is to cache a number of event log records and then shuffle the cached event log records to said TimeRangeKV module on a corresponding worker node in rounds for storage.

5. The event log system of claim 4, wherein during shuffling, a number of worker nodes simultaneously receive shuffled event log records.

6. The event log system of claim 5, wherein the number of worker nodes that simultaneously receive shuffled event log records is selected at least partly based on at least one of the number of the worker nodes, network bandwidth of a single worker node, total log ingestion bandwidth and log compression ratio.

7. The event log system of claim 2, wherein the size of said TRU is dependent upon workload.

8. The event log system of claim 1, wherein said IngestKV module is further to parse a received event log record into key-value pairs, and said TimeRangeKV module is to store the event log record in a form of timestamp and key-value pairs.

9. The event log system of claim 1, wherein said coordinator node is further to assign the log sources to said worker nodes.

10. The event log system of claim 9, wherein said coordinator node assigns the log sources to said worker nodes by:
assigning individable log sources to the worker nodes; and
then assigning dividable log sources to the worker nodes to balance throughput assigned among the worker nodes.

11. The event log system of claim 1, wherein the windows join operation with a windows size less than twice the size of one TRU.

12. A method for managing an event log, comprising:
mapping a plurality of log sources to a plurality of worker nodes, wherein each of said worker nodes comprises a processor to cause:
an IngestKV module to temporarily store event log records from the plurality of log sources; and
a TimeRangeKV module to permanently store said event log records within a plurality of adjacent time range units (TRUs), wherein the IngestKV and the TimeRangeKV perform a window join operation and wherein the IngestKV module and TimeRangeKV module replicate said event log records; and
receiving by each of said plurality of worker nodes event log records and parsing them into key-value pairs; and
storing the event log records in a form of timestamp and key-value pairs based on the (TRU).

13. The method of claim 12, wherein all the event log records within the same TRU are stored on the same worker node.

* * * * *